United States Patent
Lee et al.

(10) Patent No.: US 8,326,274 B2
(45) Date of Patent: Dec. 4, 2012

(54) OUTGOING CALLER IDENTIFICATION

(75) Inventors: Woojae Lee, Manhattan, KS (US); Cesar Perez, Olathe, KS (US); Sanjay K. Sharma, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 686 days.

(21) Appl. No.: 12/429,757

(22) Filed: Apr. 24, 2009

(65) Prior Publication Data

US 2010/0273465 A1 Oct. 28, 2010

(51) Int. Cl.
*H04M 3/42* (2006.01)

(52) U.S. Cl. ..................... 455/415; 455/414.1

(58) Field of Classification Search ....... 707/5, 999.005; 455/414.1, 414.2, 415, 550.1
See application file for complete search history.

(56) References Cited

U.S. PATENT DOCUMENTS

2006/0135197 A1* 6/2006 Jin et al. .................. 455/550.1
2009/0258637 A1* 10/2009 Liu et al. .................. 455/414.2

* cited by examiner

*Primary Examiner* — Ajit Patel
*Assistant Examiner* — Myron K Wyche (57) ABSTRACT

Systems, products, and methods are disclosed for performing a method of enabling a mobile device to perform a method of automatically associating a string with an outgoing-called number. One embodiment of the method includes, incident to at least initiating an outgoing call, establishing a communications link between a mobile device and a remote computing device through a wireless telecommunications network. The method further includes sending to the remote computing device an indication or phone number associated with the outgoing call when a label is not associated with that phone number. This label would otherwise identify an entity associated with said phone number. An embodiment continues in which a string that was identified based on the phone number is received at the mobile device. Finally, the mobile device modifies (which can including initializing) a label associated with the former mere phone number based on the string received.

15 Claims, 6 Drawing Sheets

100
OUTGOING CALLER IDENTIFICATION

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, an ability for enabling a mobile device to perform a method of automatically associating a label with an outgoing called number that is not associated with a label. In brief, embodiments of our invention contemplate an outgoing-caller-id process.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the present invention is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CDMA Code Division Multiple Access
GIS Geographic (Geospatial) Information System
GPRS General Packet Radio Service
GSM Global System for Mobile communications
I/O Input/Output
LED Light Emitting Diode
PDA Personal Data Assistant
PDSN Packet Data Serving Node
TDMA Time Division Multiple Access
Wi-Fi Wireless Fidelity Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
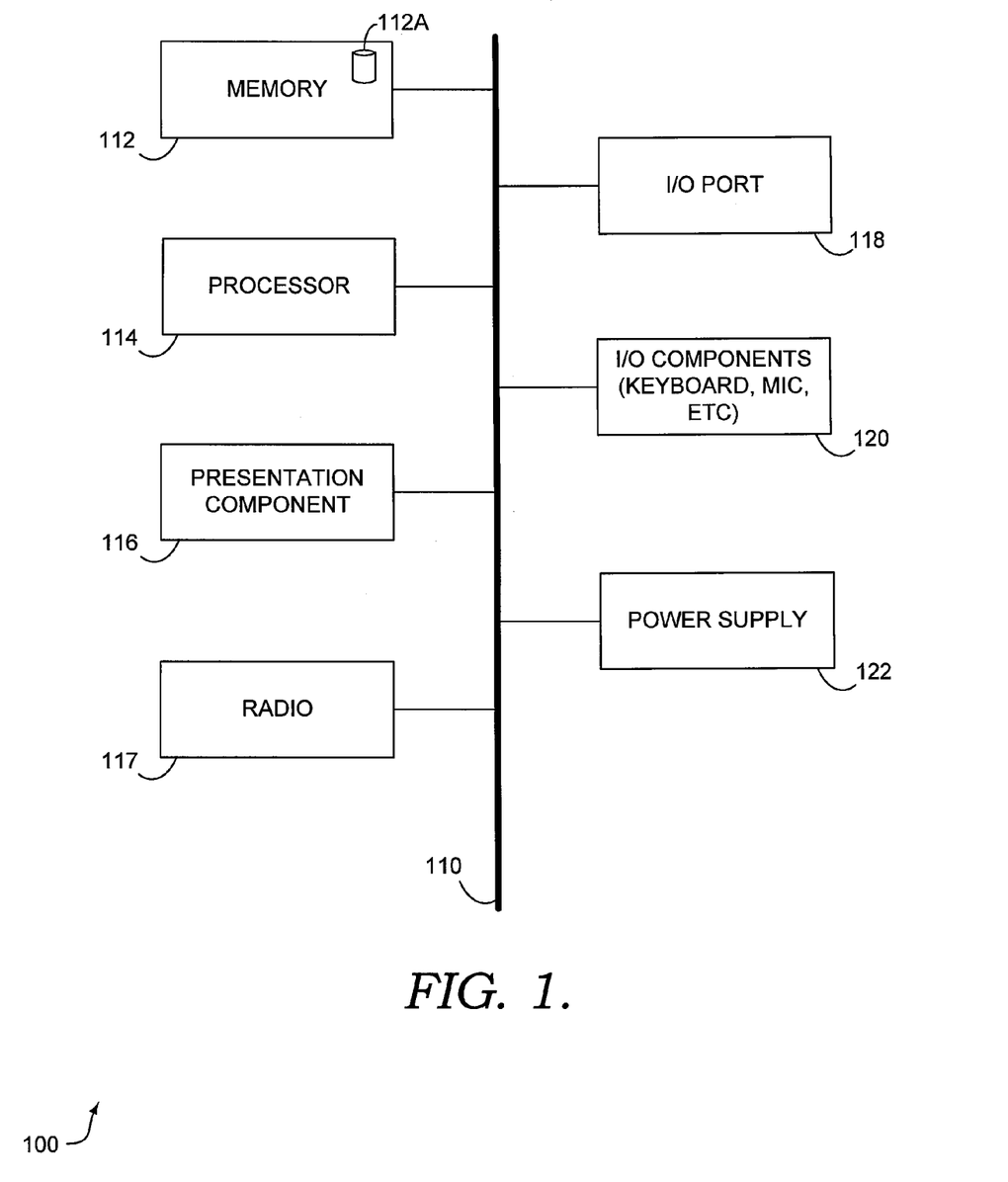
FIG. 1 depicts an illustrative mobile device suitable for practicing an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 110.

Figure 2:
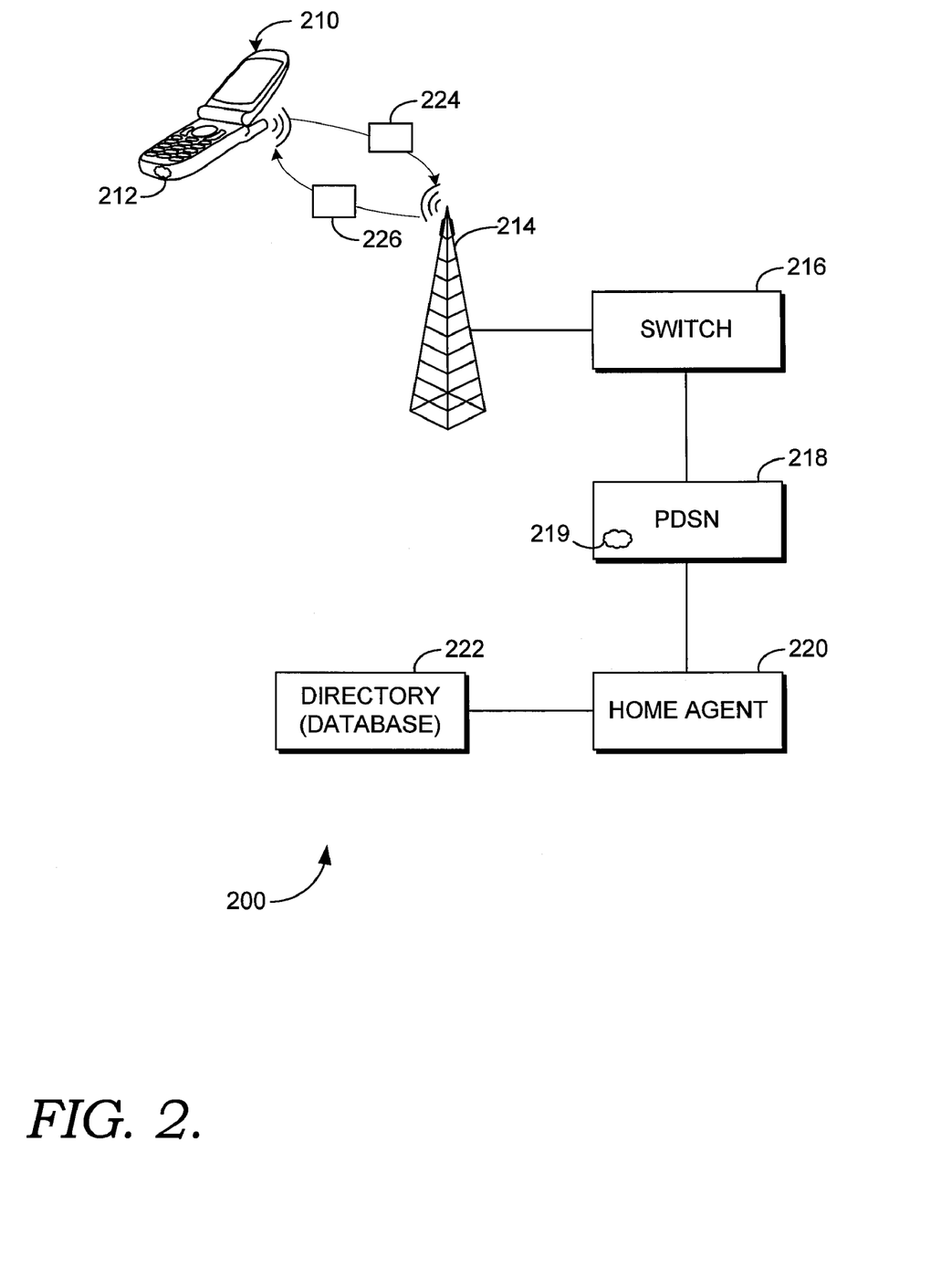
FIG. 2 depicts a first illustrative operating environment suitable for practicing an embodiment of the present invention.

Turning now to FIG. 2, an illustrative operating environment suitable for practicing an embodiment of the present invention is provided and referenced generally by the numeral 200. Operating environment 200 includes a mobile device 210, which includes a set of computer executable instructions 212. Mobile device 210 is adapted to communicate with a wireless telecommunications network, portions of which are shown including a base station 214, switch 216, packet data serving node ("PDSN") 218 (which includes a remote application 219 in an embodiment), a home agent 220, and a directory (or database) 222.

In operation, base station 214 receives communications from mobile device 210. The data received by way of a wireless communications link is communicated to a remote computing device, such as PDSN 218 by way of switch 216. That is, switch 216 helps navigate traffic that is received by way of base station 214. Although we label remote computing device 218 as a "PDSN," we do not mean to narrow the scope of the invention by implying that remote computing device 218 must be a packet data serving node. It does not need to be a packet data serving node. Rather, it can be any device that is capable of receiving information by way of switch 216 and also operable to communicate ultimately with directory 222 (via home agent 220 or not).

Again, we illustratively show home agent 220 as an intermediary between PDSN 218 and directory 222, but such does not need to be the case. Directory 222 can be any database that includes or has access to a listing of phone numbers that are paired with identification labels. Illustrative directories include electronic white pages, electronic yellow pages, or any other type of electronic directory that maps a name to a phone number, wherein the name can be the name of a person or organization that is associated with a given phone number.

As we will explain in greater detail below, at a high level, mobile device 210, in accordance with an embodiment of the present invention, communicates an outgoing-called phone number 224 through a line of telecommunications network (of which only portions are shown so as to not obscure embodiments of the present invention) such that ultimately a name 226 is returned to mobile device 210, which, by way of application 212, associates the name 226 with the outgoing-called phone number 224.

Figure 3:
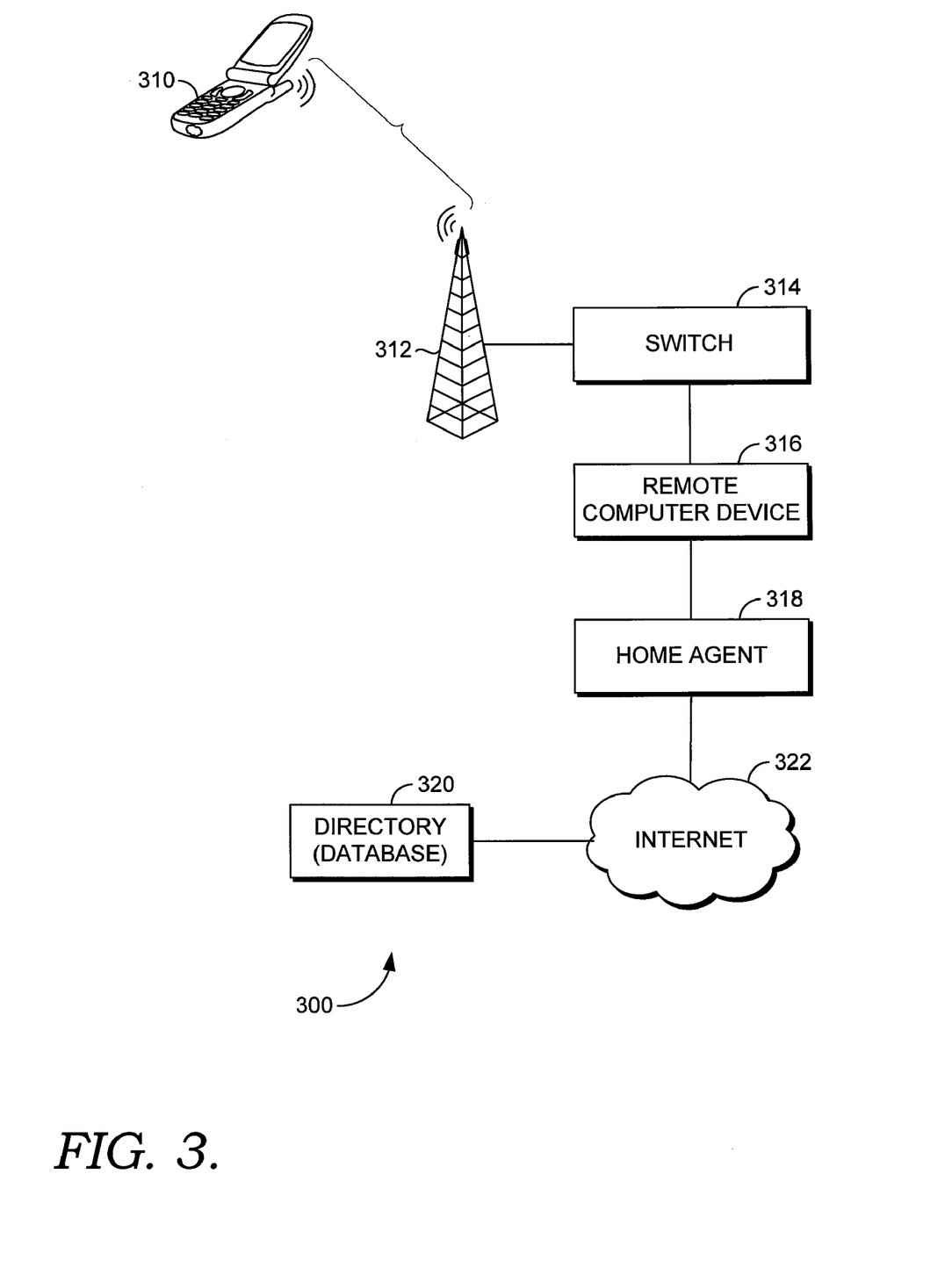
FIG. 3 depicts a second illustrative operating environment suitable for practicing an embodiment of the present invention.

Turning now to FIG. 3, another illustrative operating environment is provided and referenced generally by the numeral 300. In this operating environment, a mobile device 310 communicates by way of a wireless telecommunications network, which includes a base station 312, a switch 314 as well as a packet data serving node, or other remote computing device 316. In one embodiment, remote computing device 316 communicates by way of a home agent 318 with a directory 320 by way of the Internet 322. Thus, one difference between the operating environment 300 and operating environment 200 is that the directory 320 is not included as a portion of the wireless telecommunications network. Rather, it is a component that is reachable via the Internet 322. An advantage of this operating environment 300 is that directory 320 might be maintained by a third party instead of the owner of a wireless telecommunications network. In this way, the overhead associated with maintaining an up-to-date database of phone-number records is handled by a third party. But in other embodiments, a wireless-telecommunications-network operator might opt to manage a directory itself, in which case operating environment 200 would be applicable.

Figure 4:
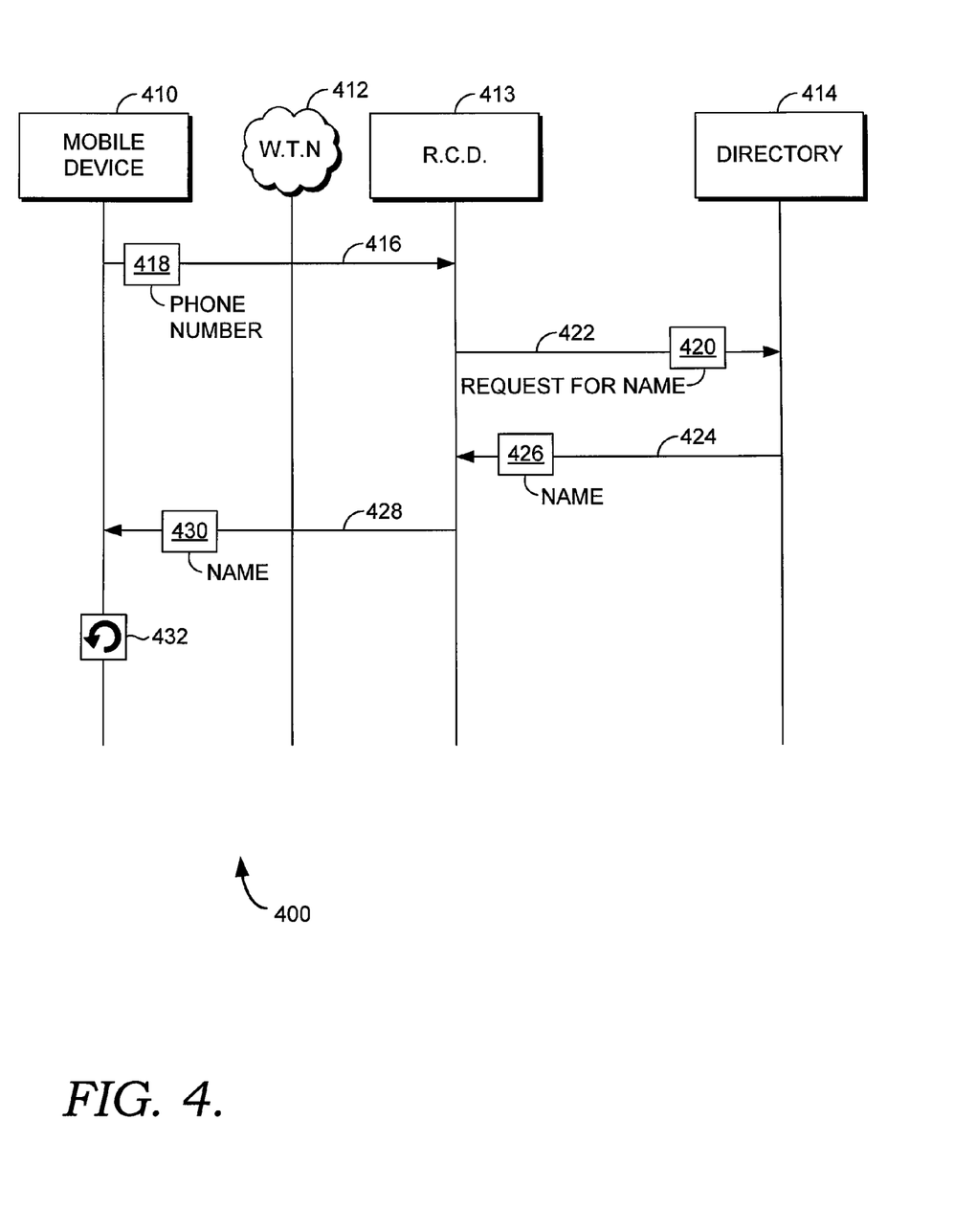
FIG. 4 depicts an illustrative flow diagram of a method for associating a string with an outgoing-called number according to an embodiment of the present invention.

Turning now to FIG. 4, a flow diagram 400 includes a high-level overview of an illustrative method for facilitating an outgoing-caller-identification process according to embodiments of the present invention. The illustrative devices include a mobile device 410, a wireless telecommunications network 412, a remote computing device 413, and a directory 414. In one embodiment, at a step 416, a phone number 418 is communicated from mobile device 410 to remote computing device 413 by way of wireless telecommunications network 412. Having received phone number 418, remote computing device 413 submits a request 420 to directory 414 at a step 422. In one embodiment, request 420 is a request for a name that is associated with phone number 418. Directory 414 is usable to return a name that corresponds to phone number 418 if one exists. If a corresponding name does exist, then, at a step 424, a corresponding name 426 is returned to remote computing device 413. Directory 414 might be stored within or be a part of remote computing device 413 in one embodiment.

At a step 428, name 430 is communicated through wireless telecommunications network 412 to mobile device 410, which, at a step 432, updates a data store that stores the outgoing phone number 418, which previously was not associated with a label. Incident to receiving name 430, application 212 updates a data store such that an appropriate label is now associated with an outgoing phone number that previously was not associated with a label. In one embodiment, the mobile device includes a data store as one of its memory/storage components. We illustratively show a data store 112A as an example of a database that is used to locally store call-related information including outgoing phone numbers; that is, phone numbers dialed from the mobile device in an attempt to reach a target recipient.

Sometimes when a user attempts to make an outgoing call, that call is not always connected. That is, a user might enter in a desired outgoing-called number, but for various reasons, the call is not actually connected to the target recipient. For example, a user might press "talk" and nothing more. In still other embodiments, a user might initiate a call so as to start the connection process, in which the user hears ringing, but the target recipient nor his or her voicemail answers. In still other embodiments, a user initiates a call and the call is actually connected. Embodiments of the present invention contemplate all of these scenarios as potential scenarios in which an entered phone number that is not associated with the label can automatically be paired with the label by way of a data session that is established between the mobile device and a remote computing device.

Thus, in one embodiment, we describe a way to enable a mobile device to perform a method of automatically associating a string with an outgoing-called number. In such an embodiment, an illustrative method includes, incident to at least initiating an outgoing call, establishing from the mobile device a communications link to a remote computing device by way of a wireless telecommunications network. This might take the form of a data session. In a wireless telecommunications networking environment, the mobile device is normally in persistent communication with its network. That is, either the mobile device or the network is generally maintaining some degree of communication with the other. For example, a mobile device is often "listening" to signals that emanate from various base stations so that if a call is ever initiated, it will know what base station to initiate communication with. Thus, one embodiment of our invention contemplates a case in which the user's mobile device's outgoing call history is updated in a behind-the-scenes fashion such that it is transparent to a user. For example, in one embodiment, a user might dial a brand new telephone number, have a conversation, and then hang up. But because the user dialed a brand new phone number, his or her outgoing-call history might initially reflect only the phone number dialed as opposed to a more helpful name of an entity associated with that phone number. By way of an embodiment of the present invention, that phone number will be replaced with a label (such as a person's name, or a company name, etc.) that is more user friendly and helpful to the user.

Thus, in one embodiment, the method continues in that an indication of a phone number associated with the aforementioned call is sent to a remote computing device such as remote computing device 316. This will generally happen when a label is not associated with the phone number. A user might opt to override a prepopulated phone number that already has a label, but generally the method of attempting to receive a label will be carried out in connection with outgoing-phone numbers that do not have labels. Generally, when we speak of a "label" we are describing a phone-number specific label. That is, a label that is specific to a certain phone number. We are not intending to include within the scope of "label" things such as an indication as to whether a phone number is a home-phone number versus a work-phone number versus a mobile-phone number. Whereas we realize that some people might read "label" so broadly, this is not the type of information that we are talking about when we mention the term "label." Rather, when we speak of a label we mean to include a person or company name that is associated with the given phone number.

Continuing with the illustrative process, a next step includes receiving from the remote computing device, a string that was identified based on the phone number. The string received might be made up of numbers, letters, characters, or combinations thereof. When the string is received, a label associated with the phone number is modified based on the string. Modifying might include initially associating a label with a phone number. That is, we do not mean to associate a narrow definition with the term "modifying," which might otherwise be construed to mean changing an already present value. This is not what we intend. Rather, when we speak of modifying, we mean to include providing an initial value.

As previously mentioned, initiating an outgoing call might include one or more various actions. For example, initiating an outgoing call might include receiving input that indicates a desired target recipient. In such a case, a user might enter a phone number associated with a desired target recipient, but never be able to actually place a call. Nonetheless, if the user desires to have his or her data store 112A updated, then this can be done by way of a user-driven process in which a user inputs an input to trigger the process of providing the phone number through the wireless telecommunications network to the remote computing device and ultimately receiving back a label associated with the phone number. In other embodiments, initiating an outgoing call might include actually placing the outgoing call. And in still other embodiments, initiating an outgoing call and actually be connected with a target recipient.

As briefly alluded to, the aforementioned process can either be an automatic process or a user-driven process. To the extent that the process is an automatic process, the automatic process might include application 212 automatically running after an outgoing call is placed or attempted to be placed. In such an embodiment, a user makes or attempts to make an outgoing call, and mobile device 210 (for example) realizes that its data store 112A does not include a label associated with the phone number just called (or attempted to be called, though we will not continue to repeat this qualification for readability). Perhaps application 212 sets a flag even prior to ending an outgoing call. That is, application 212 in one embodiment does not wait until the end of an outgoing call to at least start a process for obtaining the label to be paired with the called number. After the call ends, application 212 opens to data session with remote computing device 218 to ultimately receive name 226.

Another embodiment of an automatic process includes a process that runs at a predetermined time or frequency. For example, in such an embodiment, device 210 might be configured to inspect data store 112A at a given time every day (or greater frequency) to search for any phone numbers that are not associated with labels. If any phone numbers are found that are not associated with labels, those phone numbers can be sent in batch through wireless telecommunications network 412 so that a set of corresponding labels are received and used to update the labels (or lack thereof) now associated with the uploaded phone numbers.

In still another embodiment, a user-driven process is contemplated. In this embodiment, mobile device 210 receives an indication of a desire to have his or her data store 112A inspected and updated. In this case, data store 112A is inspected to determine whether any outgoing phone numbers exist without corresponding labels. To the extent any are found, those numbers are uploaded and then corresponding labels are received after consulting directory 222 (or 320 for example). Application 212 can then update the outgoing-call history such that instead of a phone number being displayed, a label is displayed.

Figure 5:
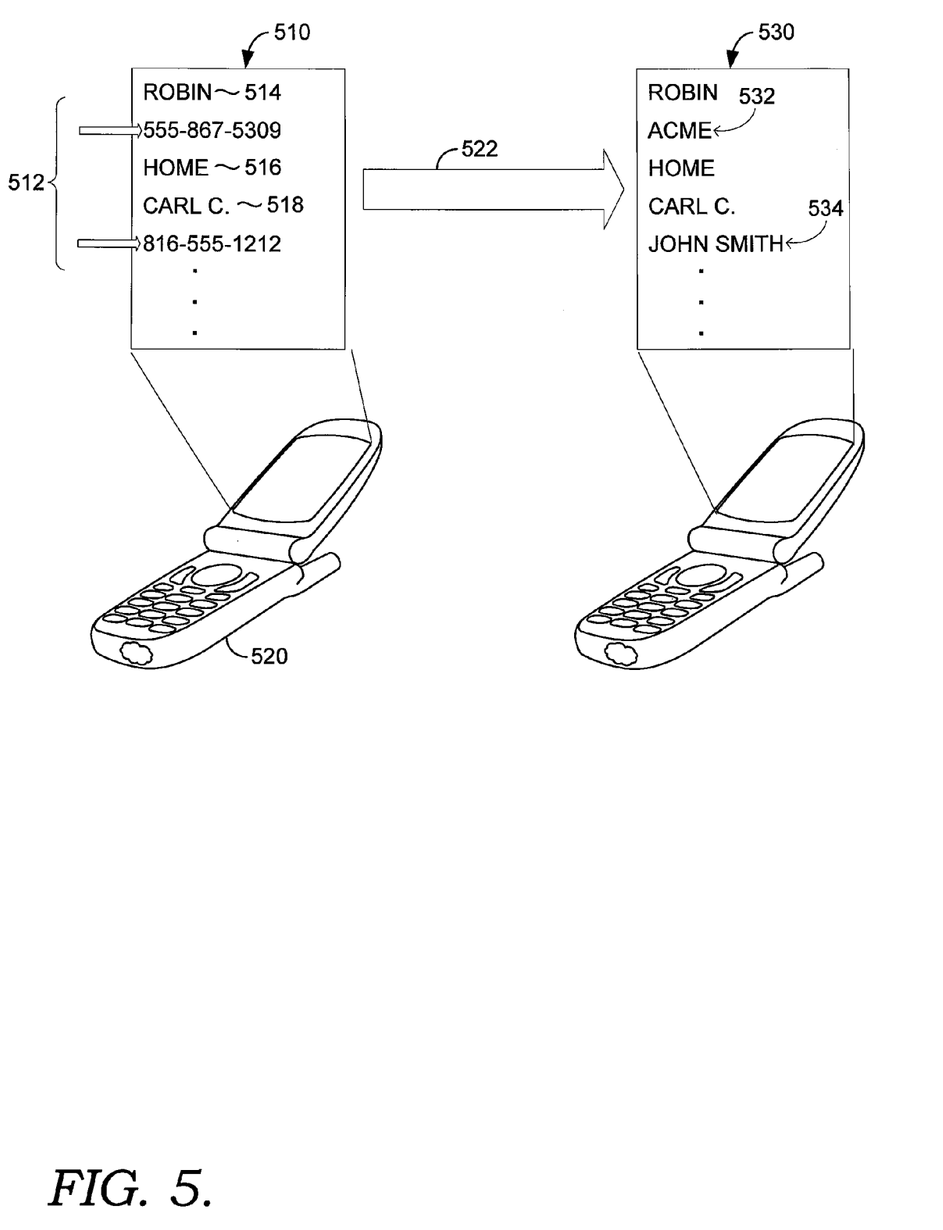
FIG. 5 depicts an illustrative transformation of an outgoing-call history from a first state to a second state that includes labels according to an embodiment of the present invention.

Show an example of this in FIG. 5.

Turning now to FIG. 5, a first state of a display of an outgoing-call history is referenced by numeral 510. Display 510 is illustratively shown to include indications of entities that have been called. Some of these indications are labels while some indications are phone numbers. For example, items 512 are mere phone numbers; namely "555-867-5309" and "816-555-1212." To some, these numbers are not as helpful as having labels associated with those numbers. Perhaps a period of days, weeks, or even months might have elapsed since a person has called such a phone number as one of those in the set 512. But if this is the case, then he or she might not remember whom they actually called. This is in contrast to items such as item 514, 516, or 518, which are all labeled. A user of mobile device 520 would know that a person named "Robin" was called at some point. Similarly, such a user would also know that he or she phoned home (by way of label 516) as well as a person named "Carl C." (by way of label 518).

By carrying out 522 a method in accordance with the present invention, call history 510 will be updated to reflect call history 530. That is, reference numeral 530 reflects a modified presentation of perhaps an outgoing-call history (or directory in general) in which items that were previously presented only as phone numbers are now presented with descriptive labels. For example, "acme" 532 is presented in place of "555-867-5309." By way of further example, "John Smith" 534 is presented in place of "816-555-1212." In this way, a user viewing presentation 530 has a much better idea of the entities called. Although we show only labels in presentation 530, an embodiment of the present invention contemplates presenting both the label as well as the phone number as a user so desires.

By way of further illustration, another illustrative method to enable a mobile device to perform a method while automatically associating a string with an outgoing-called number, an exemplary method according to an embodiment of our invention would include searching a memory component of a mobile device to locate an outgoing called number that is not associated with a label. An illustrative memory component can be memory 112 or even more specifically data store 112A. Examples of outgoing-called numbers that are not associated with labels include items marked by reference numeral 512. The illustrative process includes initiating a communications link between the mobile device and a remote computing device by way of a wireless telecommunications network. Thus, referencing FIG. 3 for example, mobile device 310 initiates a communications link to remote computing device 316. The remote computing device 316 is configured to retrieve contact information associated with the outgoing-called number. Moreover, the contact information includes an identification of an entity associated with the outgoing-called number.

One embodiment of the method further includes receiving an indication of the entity, and then associating a label with the outgoing-called number, wherein a label is derived from the indication of the entity. Thus, when a device such as mobile device 410 receives an identification of an entity associated with an outgoing-called number (such as name 430), it associates a label with a phone number such as phone number 418. Further, application 212 facilitates storing in the mobile device the label in connection with the outgoing called number. Now, when a call history is presented, the label is presented instead of or in connection with just the phone number.

As mentioned, searching the memory component (112 or 112A) can happen prior to a completion of an outgoing call associated with the outgoing-called number. In other embodiments, the method begins at the completion of an outgoing call. In still other embodiments, a hybrid approach is taken in which a first portion of the process starts before an outgoing call ends and then a latter portion of the process is completed after the outgoing call ends. An example of this includes the embodiment in which a flag is set prior to the call ending. In such an embodiment, application 212 realizes that an outgoing-called number is not associated with a label. This realization occurs prior to a completion of the outgoing call. In such a case, a bit, or flag, or other item is configured to indicate that the outgoing-called number is not associated with the label. After the outgoing call is completed, based on the setting of the aforementioned flag, bit, etc., application 212 automatically establishes a data session to ultimately receive a label that will be associated with the outgoing-called number.

In another embodiment, we describe a way to enable a remote device to perform a method of enabling a mobile device to associate a string with a given phone number. Such a method might include, for example, receiving from the mobile device a request to associate a given phone number with a name of an entity. This request is received incident to the mobile device receiving an inputted phone number for which it lacks a label that identifies an entity associated with the phone number in one embodiment. The method continues by the remote computing device facilitating referencing a data store to retrieve a name of an entity associated with the phone number. The entity might be a person or organization including a company for example. Upon receiving that name, it is communicated to the mobile device, thereby enabling it to associate the name with the phone number such that the name is presentable via a presentation component in connection with a request to present the phone number. In some embodiments, this amounts to displaying the phone number on a display device. In other embodiments, this might include reading the phone number by way of a speaker such that a person who is visually challenged is able to hear a name retrieved.

Figure 6:
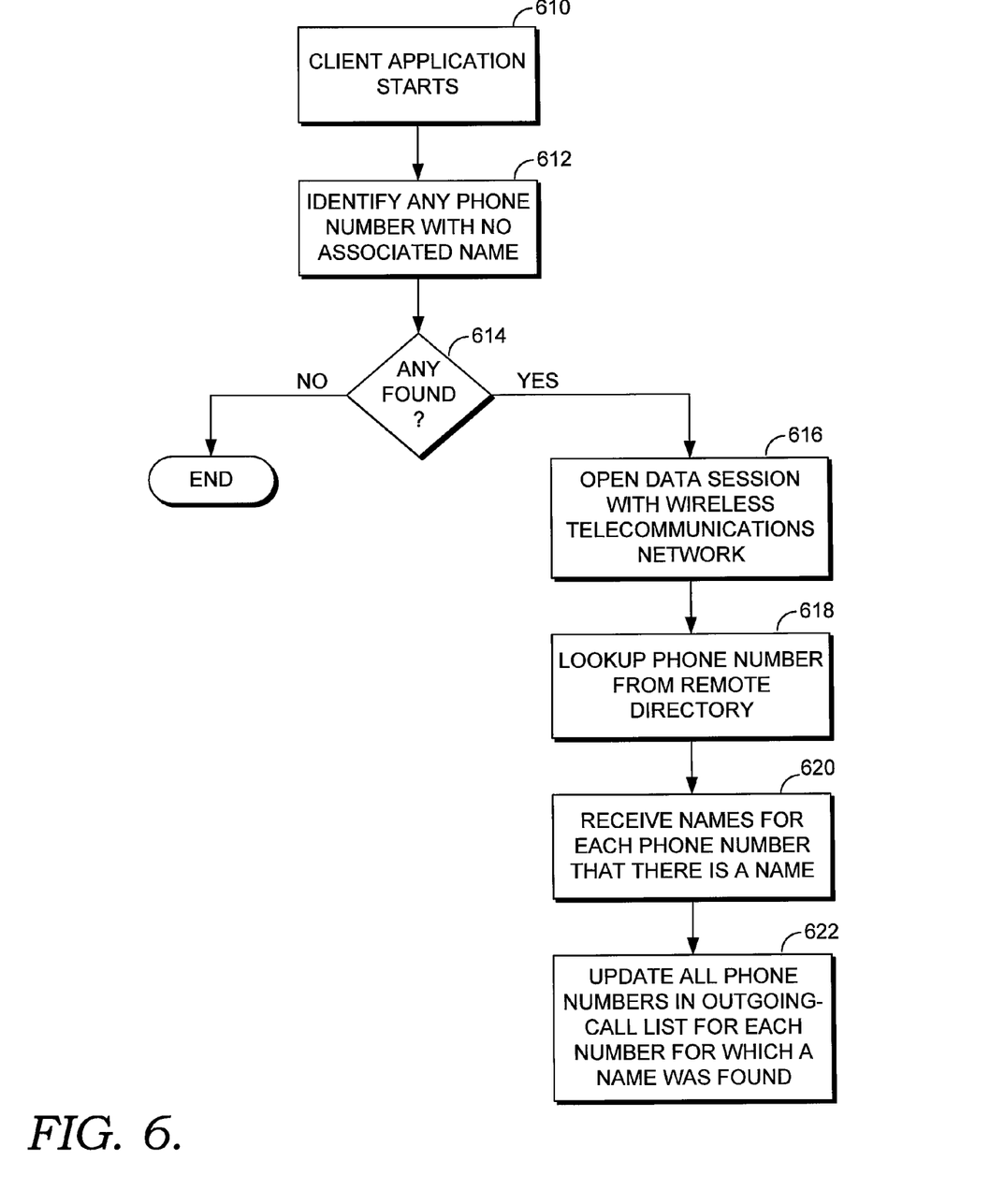
FIG. 6 depicts another illustrative method for associating a string with an outgoing-called number according to an embodiment of the present invention.

Turning now to FIG. 6, we provide an illustrative block diagram that includes one or more embodiments of the present invention. We do not mean to implicate that the steps of FIG. 6 are all necessary nor that FIG. 6 depicts all possible steps. Rather, FIG. 6 is provided with various steps to help a reader glean various aspects of embodiments of the present invention. Thus, in one embodiment, a client application starts at a step 610. An illustrative client application includes client application 212. In one embodiment, client application 212 identifies any phone number with no associated name, or label, at a step 612. If at step 614 any such phone numbers are found, then processing advances to a step 616, in which a data session is opened with the wireless telecommunications network.

The phone number is looked up at a step 618 from a remote directory, such as directory 222 or 320. At a step 620, one or more names are received for each phone number that there is a name in the directory. Having received this information, application 212 updates all the phone numbers in an outgoing-call list for each number for which a name is found at a step 622. Again, this was an illustrative flow diagram that is not meant to be all inclusive, especially because we have described several other methods for carrying out embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-executable instructions embodied thereon that, when executed, enable a mobile device to perform a method of automatically associating a string with an outgoing-called number, the method comprising:
   at the mobile device, determining whether a phone number associated with an outgoing call is associated with a label that identifies an entity associated with the phone number;
   when the phone number associated with the outgoing call is not associated with a label that identifies an entity associated with the phone number, then incident to at least initiating the outgoing call, establishing from the mobile device a communications link to a remote computing device by way of a wireless telecommunications network;
   sending to said remote computing device an indication of the phone number associated with said outgoing call;
   at the mobile device, receiving from said remote computing device a string that was identified based on said phone number;
   at the mobile device, modifying a label associated with said phone number based on said string, wherein upon modification the label identifies the entity associated with the phone number, and
   at the mobile device, storing said modified label associated with said phone number, wherein said method is performed automatically.

2. The media of claim 1, wherein said at least initiating the outgoing call includes one or more of:

receiving input that indicates a desired target recipient;
placing said outgoing call; and
being connected to said target recipient.

3. The media of claim 1, wherein said sending is accomplished by an automatic process that includes one or more of the following:
   automatically occurring after a predetermined amount of time; and
   automatically occurring at a completion of said at least initiating said outgoing call.

4. The media of claim 1, wherein said string was identified by searching a database coupled to said remote computing device.

5. The media of claim 4, wherein the database is within said wireless telecommunications network.

6. The media of claim 4, wherein the database is accessible by the remote computing device via the Internet.

7. One or more nontransitory computer-readable media having computer-executable instructions embodied thereon that, when executed, enable a mobile device to perform a method of automatically associating a string with an outgoing-called number, the method comprising:
   at the mobile device, searching a memory component of said mobile device to locate an outgoing-called number that is not associated with a label;
   at the mobile device, initiating a communications link between the mobile device and a remote computing device by way of a wireless telecommunications network,
   (A) wherein said remote computing device is configured to retrieve contact information associated with said outgoing-called number, and
   (B) wherein said contact information includes an identification of an entity associated with said outgoing-called number;
   at the mobile device, receiving said indication of said entity;
   at the mobile device, associating a label with said outgoing-called number, wherein said label is derived from said indication of said entity; and
   at the mobile device, storing in said mobile device said label in connection with said outgoing-called number, wherein said method is performed automatically.

8. The media of claim 7, wherein searching said memory component occurs prior to a completion of an outgoing call associated with said outgoing-called number.

9. The media of claim 7, wherein searching said memory component includes setting a flag when said outgoing-called number is not associated with a label.

10. The media of claim 7, wherein said initiating said communications link includes initiating said link by one or more of the following methods:
    automatically initiating when said flag is set;
    automatically initiating when said outgoing-called number is not associated with a label;
    automatically initiating after a predetermined period of time; and
    initiating after receiving input that indicates a desire to label any unlabeled outgoing-called numbers.

11. The media of claim 7, wherein said remote computing device being configured to retrieve said contact information includes said remote computing device including an ability to search a directory coupled to said remote computing device.

12. The media of claim 7, further comprising presenting said label on a presentation component of said mobile device.

13. The media of claim 12, wherein presenting said label includes presenting said label simultaneously with said phone number.

14. One or more nontransitory computer-readable media having computer-executable instructions embodied thereon that, when executed, enable a remote device to perform a method of enabling a mobile device to associate a string with a given phone number, the method comprising:
    at said remote device, receiving from said mobile device a request to associate the given phone number with a name of an entity, wherein said request is received incident to said mobile device receiving an inputted phone number for which it lacks a label that identifies an entity associated with said phone number;
    referencing a data store to retrieve a name of an entity associated with said phone number;
    receiving said name; and
    communicating said name from said remote device to said mobile device, thereby enabling said mobile device to automatically associate said name with said phone number and automatically store said name such that said name is presentable on a display device in connection with a request to present said phone number.

15. The media of claim 14, wherein referencing the data store includes referencing a data store that is accessible by way of the Internet.

* * * * *